Patented Feb. 10, 1942

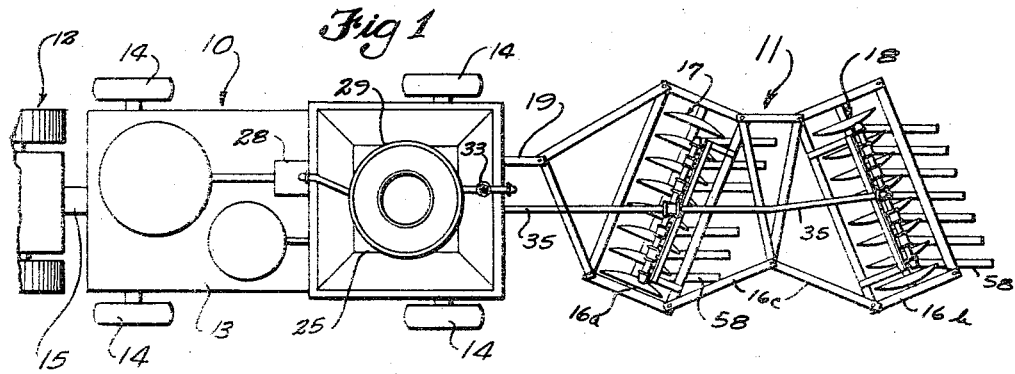
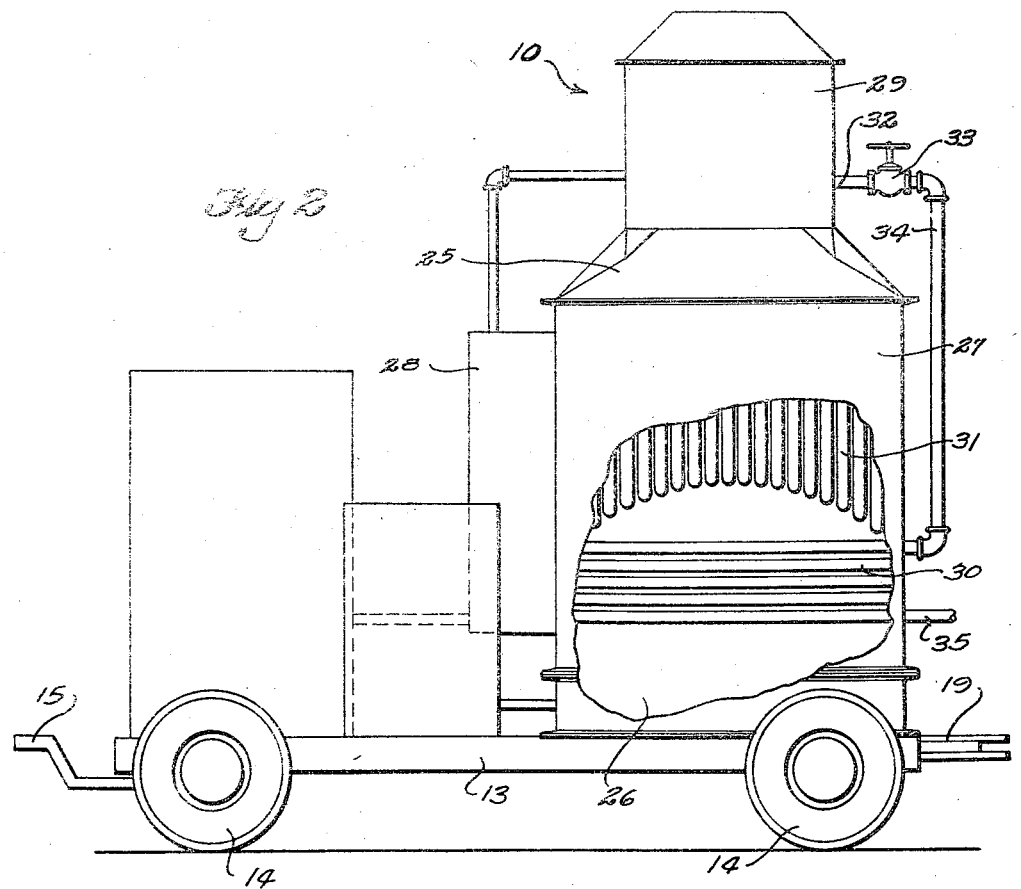

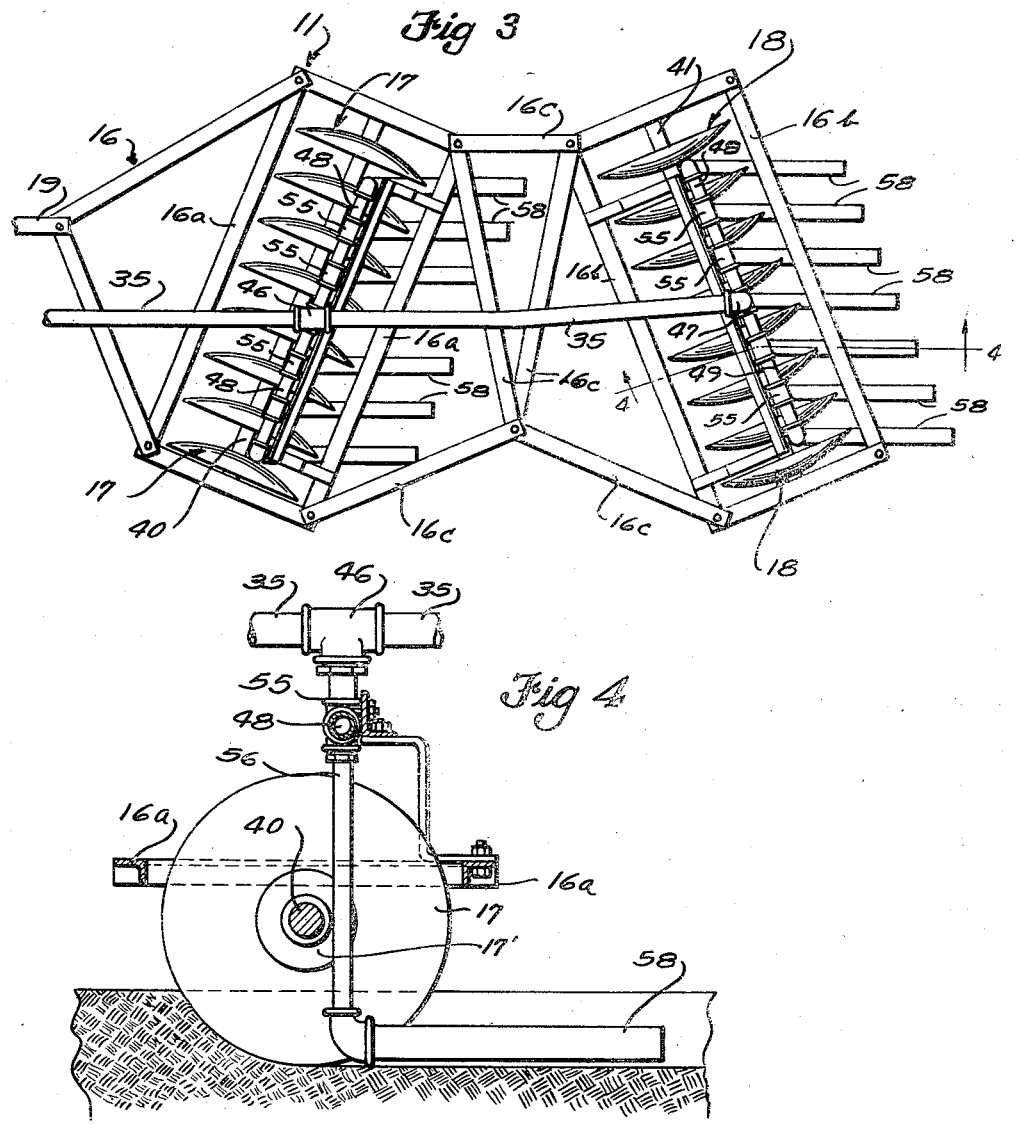

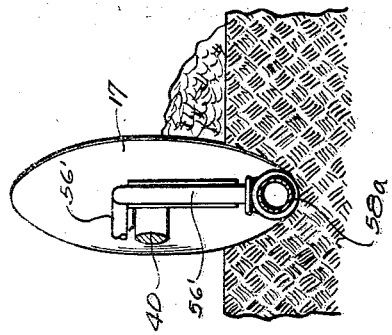
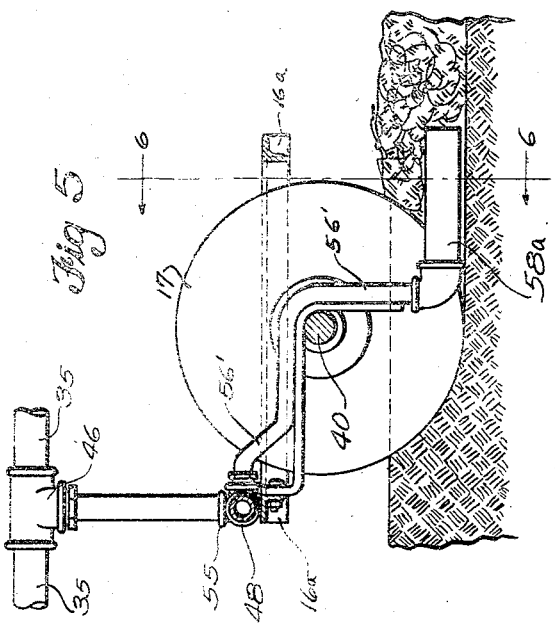

2,272,190

UNITED STATES PATENT OFFICE 2,272,190

APPARATUS FOR STERILIZING SOIL

Burr B. Elliott, Yakima, Wash., assignor to Elliott Soil Sterilizer, Inc., Yakima, Wash., a corporation of Washington Application July 4, 1939, Serial No. 282,825

3 Claims. (Cl. 111—7)

This invention relates to means for the sterilizing of the soil by use of superheated steam and has reference more particularly to improved means for superheating steam for discharge into the soil and the means provided for controlling its expansion and discharge into the soil.

The idea of injecting superheated steam into the soil as a means for killing or destroying weed seed, insect eggs, larvae, and pests in general, is quite old and various types of devices heretofore have been employed for this purpose. In my above mentioned prior application, I have disclosed a means for generating steam and for injecting it into the soil, and while a means provided in accordance with the disclosures in that application, applied the steam to the soil in a satisfactory manner, it was not as effective from the standpoint of destroying the pests as had been anticipated because of loss of heat from the steam incident to injection, and hence the present application has been made, which discloses an improved means that overcomes the deficiencies of the former device, particularly insofar as preventing loss of heat from the steam incident to injection into the ground is concerned.

Explanatory to the present invention, it will be here stated that in apparatus of the prior art utilizing steam to destroy weed seeds, insects, eggs and the like, the results have not been entirely satisfactory, mainly because of the absence of or the loss of heat from the steam incident to its being injected into the soil. This is accounted for by reason of the fact that it has generally been the usual practice to inject saturated steam under pressure into the soil and to liberate it through restricted orifices in the pipes of a distributing system. Consequently, as soon as the steam issues from the restricted orifices, it expands rapidly, blowing the loose soil back away from the steam. Due to this quick expansion, the steam loses its heat and becomes useless for its intended purpose before contact with the things it is intended to destroy.

Most garden and field soils comprise many small interstices which make up about one-third of the soil volume. These interstices contain air from which the seeds and insects of the soil receive their necessary life sustaining oxygen. A touch of the latent heat carried by steam is destructive to these potential pests and it is the purpose of the present invention to provide means for the application of steam to the soil in such manner that it will not lose its latent heat prior to displacing the air and filling all these interstices, or before coming in intimate contact with the seeds, eggs and insects, and the like, which it is desirable to destroy.

Therefore, it is the principal object of this invention to provide an improved means for generating steam and for bringing it to a superheated condition and for then applying this steam to the ground without material loss of heat prior to its displacing the air from the interstices of the soil and contacting the things it is desired to destroy.

More specifically stated, the principal object of this invention resides in the method of and in the features of construction of the means for the applying of steam to the ground for killing weed seeds, insects, eggs, and the like, in a practical and economical manner.

Other objects of the invention reside in the details of construction and combination of parts embodying the apparatus, and in their mode of operation for the control and injection of superheated steam into the ground, as will hereinafter be fully described.

In accomplishing these and other objects of the invention, I have provided the improved details of construction, the preferred forms of which are illustrated in the accompanying drawings, wherein—

Fig. 1 is a diagrammatic plan view of the units employed in the present equipment as used in connection with a tractor for drawing them entrain across a field.

Fig. 2 is an elevation of the steam generating boiler, a part thereof being broken away for better illustration of the internal structure.

Fig. 3 is a top, or plan view of the ground furrowing implement and steam injector piping system embodied in the present invention.

Fig. 4 is a vertical section on the line 4—4 in Fig. 3, illustrating the character and relationship of one of the steam discharge pipes to a ground turning disk.

Fig. 5 illustrates an alternative location of the steam pipes extending from the supply headers to the ground.

Fig. 6 is a sectional view on the line 6—6 in Fig. 5.

Referring more in detail to the drawings—

In Fig. 1, 10 designates, in general, the steam generating and superheating unit; 11 designates the ground furrowing implement, and piping system for injection of the steam into the ground, and 12 designates a tractor or the like, whereby the steam generating unit and the ground furrowing implement are drawn entrain. The tractor 12 has here been shown as being of the crawler type, and the steam generating unit has been illustrated as comprising a horizontal frame structure 13, supported by four ground wheels 14 and connected to the tractor by a draw bar structure 15, while the ground furrowing implement has been illustrated as comprising a frame structure 16, mounting therein two sets or gangs of plow disks 17 and 18, and the frame has been illustrated as equipped with a draw bar 19, which is attached pivotally to the rear of the frame of the steam generating unit so that the parts are drawn entrain by the tractor.

First describing the steam generating unit 10: This comprises the frame structure 13 supported in conventional manner by the ground wheels 14. Mounted upon the frame is a vertical boiler, designated in its entirety by numeral 25. This boiler may be of conventional design comprising a fire-box portion 26, above which is the boiler portion proper 27, equipped with a water injector system, here indicated at 28, and formed with a steam dome 29. Located in the boiler, just above the fire-box 26, are superheater coils 30, and above these the boiler is equipped with the vertical tubes 31 as is usual practice.

Leading laterally from the steam dome 29 is a steam delivery pipe 32, equipped with a hand valve 33 for controlling the outlet of steam. The pipe 32 connects at its outer end to a pipe 34 of like size, leading downwardly and then laterally to deliver the steam into the superheating coils 30.

The superheating coils, being located adjacent to or forming the sides of the fire-box, receive the steam from pipe 34, and it is therein raised to superheated condition. A pipe 35 leads from the superheater coils 30 rearwardly to conduct the steam to the ground working implement for distribution and injection into the ground; it being understood that the flow of steam is in accordance with its admittance to pipe 32 by adjustment of valve 33.

In its present preferred form, the ground working implement, designated in its entirety by numeral 11, comprises a frame structure 16, which, as shown best in Fig. 3, comprises two rectangular sections 16a and 16b, disposed respectively at front and rear of the frame and joined rigidly together in angular relationship by connecting beams and braces 16c. The section 16a, at the front end of the structure, mounts therein a gang of axially aligned disk plows 17, evenly spaced on a shaft 40, which is supported at its ends from said frame section. The plow disks 17, in this instance, have hub members 17', that revolve directly on the supporting shaft.

The rear frame section 16b likewise mounts a gang of disk plows 18, revoluble on a supporting shaft 41; the disks having mounting hubs that revolve directly on the supporting shaft, and the shaft being fixedly attached at its ends to the frame. In the implement illustrated, the front gang of plows is disposed at a slight angle with respect to the line of travel, and the rear gang is likewise disposed at a slight angle, but opposite to that of the front gang.

The steam delivery pipe 35 from the unit 10 extends horizontally and longitudinally of the machine, and centrally over the two plow gangs and at points adjacent the gangs, has fittings 46 and 47 providing connection respectively with cross headers 48 and 49 to supply them with steam from pipe 35 for discharge into the ground within the furrows formed by the disk plows.

It will be observed that each header, 48 and 49, is provided at intervals, corresponding to the spacing of the plow disks along their mounting shafts, with fittings 55 whereby connection is made with downwardly directed pipes 56 that extend along the back sides of the corresponding disks and then turn rearwardly and each is connected with a horizontal pipe 58 which is designed to be drawn along the furrow formed by the corresponding plow disk and to be covered by the loose dirt thrown thereover by the action of the next adjacent disk. These horizontal pipes are of such length that their rearward ends will, in operation of the device, always be buried, and any steam that is discharged therefrom must necessarily be retained in the soil.

The effectiveness of the present apparatus resides in the provision for control of the expansion of steam from the point of initial generation through the superheating period and to the final point of application, and this is herein accomplished by the provision of distributing pipes of predetermined relationship and valves for the control of the admittance of steam thereto.

The steam, as generated and confined in the boiler, can be released as desired by the manipulation of hand valve 33, for admittance to the superheating coils. The superheated steam then flows through the pipe 35 to the headers 48 and 49, for distribution to the pipes 56 and for discharge from pipes 58. The headers are somewhat lesser in diameter than pipe 35 and likewise the pipes 56 are of smaller diameter than the headers so as to provide that all may be supplied to approximately the same extent. However, the pipes 58 have a substantially greater diameter than pipes 56.

The supply pipe 35 in any event would be sufficiently large to supply the headers 48 and 49 with steam at substantially the same pressure as delivered into pipe 35, and the pipes 56' which lead from the headers would be reduced in size according to the number used so as to still retain the pressure of the superheated steam. However, the pipes 58a in which the steam is permitted to expand should be substantially twice the diameter of the supply pipes 56.

In Figs. 5 and 6, I have illustrated an alternative piping arrangement wherein the steam delivery pipes 56' extend from the header, which may be placed forwardly of the disks, horizontally and directly over the cross axle of the gang of plows; then directed downwardly and along the rear faces of the plow disks, conforming to their contour, and connect at their lower ends, within the furrows provided by the plow disks, with the horizontal, enlarged expansion sections 58a.

By reason of the pipes 58 or 58a being substantially larger than the supply pipes 56 and 56', the superheated steam supplied through the latter will be given the opportunity of expanding to an appreciable extent so that it will not be discharged from the pipe 58 under any substantial degree of pressure that would blow the dirt back from the end of the discharge pipe. The pipe 58, however, retains the steam against dissipation of its heat until it is discharged into the ground. The loss of heat that is incident to the expansion of steam in the pipe 58 is immaterial, and is not in the same proportion as would be the case if saturated steam was admitted from pipe 56 into pipe 58.

It is understood that steam is admitted from the boiler as needed to supply the system, under control of the valve 33.

Since the steam is emitted from the pipe 58 or 58a under low pressure, which would be reduced to that pressure sufficient only to cause it to enter the ground, and yet is admitted at high temperature, a very effective killing operation of seeds, insect eggs, larvae, etc., is accomplished.

It is to be borne in mind that it is necessary to heat the ground to a substantially high degree of temperature and this cannot be done to the desired degree of satisfaction with the use of saturated steam, because, as soon as the saturated steam enters the ground, its expansion decreases its temperature to a degree that is not sufficient for the intended operation.

It is recognized that alterations, and modifications in the apparatus itself could be made without departing from the spirit of the invention, and therefore I do not desire that the claims be restricted to details, but that they be given an interpretation that is commensurate with the invention disclosed.

Having thus described my invention, what I claim as new therein and desire to secure by Letters Patent is—

1. A mobile apparatus for sterilizing soil comprising means for maintaining a supply of superheated steam, means for turning furrows of soil, a pipe system for the discharge of superheated steam from the supply into the ground beneath the turned soil and including a section of pipe of increased diameter at the discharge end of the pipe system in which the steam will expand and its pressure be reduced with no material loss of heat.

2. A mobile apparatus for sterilizing soil, comprising a means for generating steam, a superheating unit, means for effecting a controlled admittance of steam from the generator to the superheating unit, means for turning the soil in furrows, a piping system extending from the superheating unit for application of superheated steam to the soil beneath the turned furrows of ground; said piping system having, at the discharge end, a pipe section of increased diameter in which the steam will expand with a resultant decrease in pressure with no substantial loss of heat.

3. An apparatus as recited in claim 2 wherein the pipe section of increased diameter is of substantial length and so disposed as to be contained lengthwise in the furrow formed by the soil turning means, and beneath the turned soil.

BURR B. ELLIOTT.